US007941255B2

(12) United States Patent
Wimmer et al.

(10) Patent No.: US 7,941,255 B2
(45) Date of Patent: May 10, 2011

(54) PROCESS AND APPARATUS FOR DETECTING DAMPER DAMAGE (75) Inventors: Markus Wimmer, Bruckmuehl (DE); Serge Vos, Munich (DE); Marcus Jautze, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1383 days.

(21) Appl. No.: 10/846,504

(22) Filed: May 17, 2004

(65) Prior Publication Data
US 2004/0225426 A1    Nov. 11, 2004

Related U.S. Application Data

(63) Continuation of application No. 09/873,290, filed on Jun. 5, 2001.

(30) Foreign Application Priority Data

Jun. 10, 2000  (DE) ................... 100 28 749

(51) Int. Cl.
*B60Q 1/00*  (2006.01)
(52) U.S. Cl. .......................... 701/29; 73/118.1; 340/438
(58) Field of Classification Search ............ 701/29, 701/71, 36, 37; 702/183; 340/438, 444, 340/441, 467, 440; 73/118.1, 11.04; 280/707
See application file for complete search history.

(56) References Cited

U.S. PATENT DOCUMENTS

| 4,458,535 | A | * | 7/1984 | Juergens ................... 73/651 |
| 4,975,849 | A |   | 12/1990 | Ema ..................... 364/424.05 |
| 5,525,960 | A |   | 6/1996 | McCall et al. ............. 116/34 R |
| 5,692,587 | A | * | 12/1997 | Fratini, Jr. .............. 188/266.2 |
| 5,844,474 | A |   | 12/1998 | Saling et al. ............... 177/137 |
| 5,895,846 | A |   | 4/1999 | Chamussy et al. .......... 73/146.2 |
| 5,897,130 | A | * | 4/1999 | Majeed et al. ............ 280/5.507 |
| 5,931,887 | A |   | 8/1999 | Hac ....................... 701/71 |
| 6,002,327 | A | * | 12/1999 | Boesch et al. ............... 340/442 |
| 6,181,997 | B1 | * | 1/2001 | Badenoch et al. ............ 701/37 |
| 6,182,021 | B1 | * | 1/2001 | Izumi et al. ................ 702/138 |
| 6,234,654 | B1 | * | 5/2001 | Okuchi et al. ............... 362/466 |
| 6,278,361 | B1 | * | 8/2001 | Magiawala et al. ........... 340/438 |
| 6,759,952 | B2 | * | 7/2004 | Dunbridge et al. ........... 340/444 |

FOREIGN PATENT DOCUMENTS

| DE | 44 32 892 A1 | 9/1994 |
| DE | 44 32 893 A1 | 9/1994 |
| DE | 44 40 413 A1 | 11/1994 |
| DE | 44 32 892 A1 | 3/1996 |
| DE | 44 40 413 A1 | 5/1996 |
| DE | 199 47 385 A1 | 10/1999 |
| EP | 0 455 993 A2 | 4/1991 |
| EP | 0 701 914 A2 | 7/1995 |
| EP | 0 743 204 A2 | 4/1996 |
| EP | 0 795 429 A2 | 3/1997 |
| GB | 2 342 452 A | 4/2000 |

* cited by examiner

*Primary Examiner* — Ronnie Mancho
(74) *Attorney, Agent, or Firm* — Crowell & Moring LLP (57) ABSTRACT

In a method and apparatus for detecting shock absorber damage, features of a shock absorber are determined by analyzing a signal of an antilock braking system rotational wheel speed sensor.

35 Claims, 8 Drawing Sheets

PROCESS AND APPARATUS FOR DETECTING DAMPER DAMAGE

BACKGROUND AND SUMMARY OF THE INVENTION

This application claims the priority of German patent document 100 28 749.2, filed Jun. 10, 2000, the disclosure of which is expressly incorporated by reference herein.

The invention relates to a method and apparatus for detecting shock absorber damage, particularly in a motor vehicle.

Proper maintenance of vehicles requires continuous availability of information concerning the wear condition of important vehicle components, including in particular the shock absorbers.

Depending on the shock absorber construction (for example, single-tube gas pressure shock absorbers and twin-tube shock absorbers), different damage patterns may occur, such as pitting on the piston rod, wear of the piston rod or leaks in the separating piston packing, which become noticeable by a drop of the shock absorbing action. The shock absorbing effect will decrease and the vehicle body vibrations and vehicle vibrations in the vertical direction will be absorbed to a lesser degree.

In known methods for detecting shock absorber damage, the shock absorber is either tested in the installed condition on a test stand (such as the Boge Shock Tester) or is analyzed in the removed condition on a testing machine (such as the VDA Testing Machine). These known shock absorber damage detection methods have the disadvantage that they provide no information concerning the shock absorbing characteristics during driving operation. Rather, time-consuming and cost-intensive checking is required on a special test stand; and the shock absorber may even have to be removed before the checking.

One object of the invention is to provide a method and apparatus for detection of shock absorber damage which permit analysis of the shock absorber condition during driving operation.

This and other objects and advantages are achieved by the shock absorber evaluation method and apparatus according to the invention, based on the idea of using the signal of an antilock braking system (ABS) rotational wheel speed sensor to detect shock absorber damage. According to the invention, a conclusion with respect to shock absorber condition can be drawn by analyzing the ABS rotational wheel speed signal in a particular frequency range or ranges.

According to a first embodiment, the rotational speed change $\Delta n$ of the rim (high-pass-filtered ABS signal) is used for detecting shock absorber damage.

As an alternative, the radius change $\Delta r$ of the tire is computed from the rotational speed signal supplied by the ABS rotational wheel speed sensor according to the following equation:

$$\Delta r = \frac{v}{n} - r_0 \quad (1)$$

wherein:
v: longitudinal vehicle velocity [m/s], if slip≈0; (preferably averaged from 4 rotational wheel speed signals)
n: rotational speed of rim [wheel/s] (ABS signal, input quantity)
$r_0$: static tire radius [m]

From the time varying signal for the radius change $\Delta r$ of the tire or the rotational speed change $\Delta n$ of the rim, its auto power density spectrum $\Phi_{\Delta r}$ or $\Phi_{\Delta n}$ is computed. The computing of the auto power density spectrum from the tire radius change signal has the advantage that it uses a quantity which is independent of driving speed.

The relationship between the road irregularity h acting upon the wheel (and thus upon the shock absorber) and the rotational speed change of the rim or the radius change of the tire can be represented system-theoretically by means of a frequency response function $G_{\Delta n}$ or $G_{\Delta r}$ which also includes the condition of the shock absorber.

For the excitation h (that is, the road irregularity), the auto power density spectrum is given by the following equation:

$$\Phi_h(\omega) = \Phi_h(\Omega_0) \cdot v^{w-1} \cdot \Omega_0^w \cdot \omega^{-w} \quad (2)$$

wherein:
$\Phi_h(\Omega_0)$: extent of irregularity (depends on the road construction, such as cement base, asphalt, cobblestone pavement, etc.) [$m^3$]
v: longitudinal vehicle velocity [m/s]
w: bumpiness [–], (≈2)
$\Omega_0^w$: reference wavelength [$m^{-w}$]
$\omega$: timing circuit frequency [wheel/s]

(Reference is made in this respect to Mitschke, M.: "Dynamics of Motor Vehicles", Volume B: "vibrations", 2nd Edition, Springer Publishers, Berlin, 1984).

Within the scope of the invention, it has been found that, in the auto power density spectrum of the rotational speed of the rim determined by means of the ABS rotational wheel speed sensor or the computed radius change of the tire, there are ranges which depend on the shock absorption parameter d and ranges which are essentially independent of the shock absorption parameter d. (The shock absorption parameter d characterizes the generated shock absorbing action with respect to the relative speed of the shock absorber.) In the auto power density spectrum, according to the invention the latter represent a reference frequency range which preferably has the frequencies $\omega_{2,i}$ in the interval of 19 to 22 Hz or of approximately 30 to 33 Hz. According to the invention, the ranges which are dependent on the shock absorption parameters represent an analysis frequency range in the auto power density spectrum, which analysis frequency range preferably has frequencies $w_{1,i}$ in the interval of approximately 12 to 15 Hz.

For the auto power density spectrum of the radius change of the tire $\Phi_{\Delta r}(\omega_{1,i}, d)$ or of the rotational speed change of the rim $\omega_{\Delta n}(\omega_{1,i}, d)$ in the analysis frequency range or in the analysis interval, the following therefore applies according to the invention:

$$\Phi_{\Delta r}(\omega_{1,i}, d) = |G_{\Delta r}(\omega_{1,i}, d)|^2 \cdot \Phi_h(\omega_{1,i}) \quad (3a) \text{ and}$$

$$\Phi_{\Delta n}(\omega_{1,i}, d) = |G_{\Delta n}(\omega_{1,i}, d)|^2 \cdot \Phi_h(\omega_{1,i}) \quad (3b)$$

For the auto power density spectrum of the radius change of the tire or of the rotational speed change of the rim in the reference frequency range or in the reference interval, the following therefore applies according to the invention:

$$\Phi_{\Delta r}(\omega_{2,i}) = |G_{\Delta r}(\omega_{2,i})|^2 \cdot \Phi_h(\omega_{2,i}) \quad (4a) \text{ and}$$

$$\Phi_{\Delta n}(\omega_{2,i}) = |G_{\Delta n}(\omega_{2,i})|^2 \cdot \Phi_h(\omega_{2,i}) \quad (4b).$$

By forming a quotient of equations (3a) and (4a) as well as (3b) and (4b), the following equations are obtained:

$$DSKW_{\Delta r} = \sum_{i=1}^{k} \frac{|G_{\Delta r}(\omega_{1,i}, d)|^2}{|G_{\Delta r}(\omega_{2,i})|^2} = \sum_{i=1}^{k} \frac{\Phi_{\Delta r}(\omega_{1,i}, d)}{\Phi_{\Delta r}(\omega_{2,i})} \cdot \left(\frac{\omega_{1,i}}{\omega_{2,i}}\right)^w \quad (5a)$$

and $$DSKW_{\Delta n} = \sum_{i=1}^{k} \frac{|G_{\Delta n}(\omega_{1,i}, d)|^2}{|G_{\Delta n}(\omega_{2,i})|^2} = \sum_{i=1}^{k} \frac{\Phi_{\Delta n}(\omega_{1,i}, d)}{\Phi_{\Delta n}(\omega_{2,i})} \cdot \left(\frac{\omega_{1,i}}{\omega_{2,i}}\right)^w \quad (5b)$$

wherein w is preferably approximately 2.

According to the invention, this quotient $DSKW_{\Delta r}$ or $DSKW_{\Delta n}$ corresponds to a characteristic shock absorber damage value, which changes when the shock absorption parameter d changes (that is, the shock absorber deteriorates), because, as a result, the frequency response function $G_{\Delta n}$ or $G_{\Delta r}$ is changed or influenced. This permits the derivation of a conclusion with respect to the shock absorber condition. The signal, which corresponds to the characteristic shock absorber damage value $DSKW_{\Delta r}$ or $DSKW_{\Delta n}$, is preferably low-pass filtered in order to obtain a smoothing.

The rotational speed signal of the rim or the computed radius change of the tire contains the useful signal which is of interest (with the recognizable resonance frequencies of the vehicle body and the rim or tire as well as the resonance frequency of the rotational speed of the rim and the belt) on the one hand, and a signal which is interfering for the analysis in the frequency range, in the form of an equal component and a drift in the signal. The equal component depends on the instantaneous driving speed, while the drift is caused by acceleration or deceleration of the vehicle. These interference effects can be eliminated, preferably by high-pass filtering of the rotational speed signal, particularly of the ABS rotational wheel speed signal, preferably with a corner frequency of 1 Hz.

In the described embodiment according to the invention, computation of the characteristic shock absorber damage value $DSKW_{\Delta r}$ or $DSKW_{\Delta n}$ is a function of the parameter w (bumpiness), which is preferably equal to 2. In a second embodiment according to the invention, a computation of the characteristic shock absorber damage value is suggested which is independent of the bumpiness, that is, of the road surface.

Here, the basic idea is to introduce a second reference interval with the frequency values $\omega_{3,i}$, preferably in the range of from 30 to 33 Hz, the first reference interval $\omega_{2,i}$ in this case preferably being in the range of from 19 to 22 Hz.

The following applies with respect to the auto power density spectrum of the radius change of the tire or of the rotational speed change of the rim in a reference frequency range 2 or in the reference interval 2:

$$\Phi_{\Delta r}(\omega_{3,i}) = |G_{\Delta r}(\omega_{3,i})|^2 \cdot \Phi_h(\omega_{3,i}) \quad (6a) \text{ and}$$

$$\omega_{\Delta n}(\omega_{3,i}) = |G_{\Delta n}(\omega_{3,i})|^2 \cdot \Phi_h(\omega_{3,i}) \quad (6b).$$

Based on the above equations (2), (3) and (4), a new characteristic damage value $DSKW'_{\Delta r}$ or $DSKW'_{\Delta n}$ can now be defined.

$$DSKW'_{\Delta r} = \sum_{i=1}^{k} \left( \frac{\left|\frac{G_{\Delta r}(\omega_{1,i}, d)}{G_{\Delta r}(\omega_{2,i})}\right|^2}{\left|\frac{G_{\Delta r}(\omega_{2,i})}{G_{\Delta r}(\omega_{3,i})}\right|^2} \right) \quad (7a)$$

$$= \sum_{i=1}^{k} \left( \frac{\frac{\Phi_{\Delta r}(\omega_{1,i}, d)}{\Phi_{\Delta r}(\omega_{2,i})} \cdot \left(\frac{\omega_{1,i}}{\omega_{2,i}}\right)^w}{\frac{\Phi_{\Delta r}(\omega_{2,i})}{\Phi_{\Delta r}(\omega_{3,i})} \cdot \left(\frac{\omega_{2,i}}{\omega_{3,i}}\right)^w} \right)$$

$$DSKW'_{\Delta n} = \sum_{i=1}^{k} \left( \frac{\left|\frac{G_{\Delta n}(\omega_{1,i}, d)}{G_{\Delta n}(\omega_{2,i})}\right|^2}{\left|\frac{G_{\Delta n}(\omega_{2,i})}{G_{\Delta n}(\omega_{3,i})}\right|^2} \right) \quad (7b)$$

$$= \sum_{i=1}^{k} \left( \frac{\frac{\Phi_{\Delta n}(\omega_{1,i}, d)}{\Phi_{\Delta n}(\omega_{2,i})} \cdot \left(\frac{\omega_{1,i}}{\omega_{2,i}}\right)^w}{\frac{\Phi_{\Delta n}(\omega_{2,i})}{\Phi_{\Delta n}(\omega_{3,i})} \cdot \left(\frac{\omega_{2,i}}{\omega_{3,i}}\right)^w} \right)$$

wherein:

$G_x(\omega_{1,i}, d)$ frequency response function, analysis interval, center frequency $\omega_1$, partial frequencies $\omega_{1,i}$ are within the analysis interval;

$G_x(\omega_{2,i})$: frequency response function, reference interval 1, center frequency $\omega_2$, partial frequencies $\omega_{2,i}$ are within the reference interval 1;

$G_x(\omega_{3,i})$: frequency response function, reference interval 2, center frequency $\omega_3$, partial frequencies $\omega_{3,i}$ are within the reference interval 2;

$\Phi_x(\omega_{1,i}, d)$: auto power density spectrum radius change or rotational speed, analysis interval, center frequency $\omega_1$;

$\Phi_x(\omega_{2,i})$: auto power density spectrum radius change or rotational speed, reference interval 1, center frequency $\omega_2$;

$\Phi_x(\omega_{3,i})$: auto power density spectrum radius change or rotational speed, reference interval 2, center frequency $\omega_3$;

$\omega_{1,i}$: angular frequency $(2 \cdot \pi \cdot f)$ analysis interval;

$\omega_{2,i}$: angular frequency $(2 \cdot \pi \cdot f)$ reference interval 1;

$\omega_{3,i}$: angular frequency $(2 \cdot \pi \cdot f)$ reference interval 2;

$w$: bumpiness road

If the widths of the three intervals are now selected to be small, and the center frequencies $\omega_1$, $\omega_2$, and $\omega_3$ such that the following applies:

$$\left(\frac{\omega_{1,i}}{\omega_{2,i}}\right) \approx \left(\frac{\omega_{2,i}}{\omega_{3,i}}\right), \text{ with } i = 1 \ldots k$$

a characteristic damage value $DSKW'_{\Delta R}$ or $DSKW'_{\Delta n}$ is obtained which is independent of the bumpiness w.

The following is obtained for this characteristic damage value:

$$DSKW'_{\Delta r} = \sum_{i=1}^{k} \left( \frac{\left|\frac{G_{\Delta r}(\omega_{1,i}, d)}{G_{\Delta r}(\omega_{2,i})}\right|^2}{\left|\frac{G_{\Delta r}(\omega_{2,i})}{G_{\Delta r}(\omega_{3,i})}\right|^2} \right) = \sum_{i=1}^{k} \left( \frac{\frac{\Phi_{\Delta r}(\omega_{1,i}, d)}{\Phi_{\Delta r}(\omega_{2,i})}}{\frac{\Phi_{\Delta r}(\omega_{2,i})}{\Phi_{\Delta r}(\omega_{3,i})}} \right) \quad (8a)$$

$$DSKW'_{\Delta n} = \sum_{i=1}^{k} \left( \frac{\left|\frac{G_{\Delta n}(\omega_{1,i}, d)}{G_{\Delta n}(\omega_{2,i})}\right|^2}{\left|\frac{G_{\Delta n}(\omega_{2,i})}{G_{\Delta n}(\omega_{3,i})}\right|^2} \right) = \sum_{i=1}^{k} \left( \frac{\frac{\Phi_{\Delta n}(\omega_{1,i}, d)}{\Phi_{\Delta n}(\omega_{2,i})}}{\frac{\Phi_{\Delta n}(\omega_{2,i})}{\Phi_{\Delta n}(\omega_{3,i})}} \right) \quad (8b)$$

Equations (5a), (5b), (8a), (8b) show that a check has to take place as to whether the respective expression in the denominator exceeds a threshold to be defined, so that no division will occur by zero or by a figure close to zero. If the denominator expression falls below this threshold, the computation is not carried out.

Figure 11:
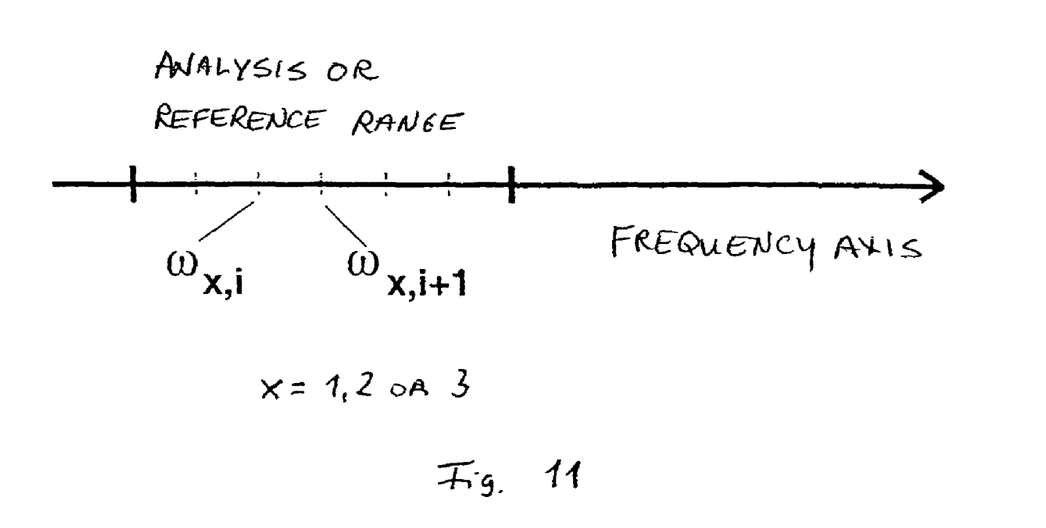
FIG. 11 shows the nomenclature for the frequency values $\omega_{1,i}$.

FIG. 11 shows the nomenclature for the frequency values $\omega_{1,i}$, wherein x=1, 2 or 3, in the analysis and reference range on the frequency axis.

Based on equation (5a) and equation (5b), it is illustrated that, for the characteristic shock absorber damage value $DSKW_{\Delta r}$ or $DSKW_{\Delta n}$, a quotient is computed from two auto power density values. Since the auto power density is a measurement of the energy content of a signal for a specific frequency interval, according to the invention, by means of a suitable mounting of filters, a characteristic damage value $DSKW_{\Delta r,F}$, $DSKW_{\Delta n,F}$ or $DSKW'_{\Delta r,F}$, $DSKW'_{\Delta n,F}$ can be defined which is similar to the $DSKW_{\Delta R}$, $DSKW_{\Delta n}$ or $DSKW'_{\Delta r}$, $DSKW'_{\Delta n}$.

The characteristic damage value $DSKW_{\Delta r,F}$ or $DSKW_{\Delta n,F}$ is based on equation (5a) or equation (5b).

The definition for the auto power density spectrum is supplied in equation (A).

$$\Phi_x(\omega) = \lim_{T \to \infty} \frac{|X(j\omega)|^2}{2T} \quad (A)$$

This illustrates that the auto power density spectrum of a quantity x is equal to the squared amplitude spectrum $X(j\omega)$ divided by twice the observation time T.

The amplitude of a signal in a defined frequency range can be determined by filtering with a narrowly limited band pass, and subsequent value formation of the determined maxima and minima. The amplitude of the time signal corresponds approximately to the value in the amplitude spectrum for the corresponding frequency range. Since the auto power density spectrum is determined for a time period T, a filtering takes place by means of a first low pass (forming the average over the time period). This filtering is followed by a quotient formation in order to obtain the $DSKW_{\Delta r,F}$ or $DSKW_{\Delta n,F}$ (compare FIG. 6), after further filtering by means of a second low pass (to determine a long-term trend).

Figure 6:
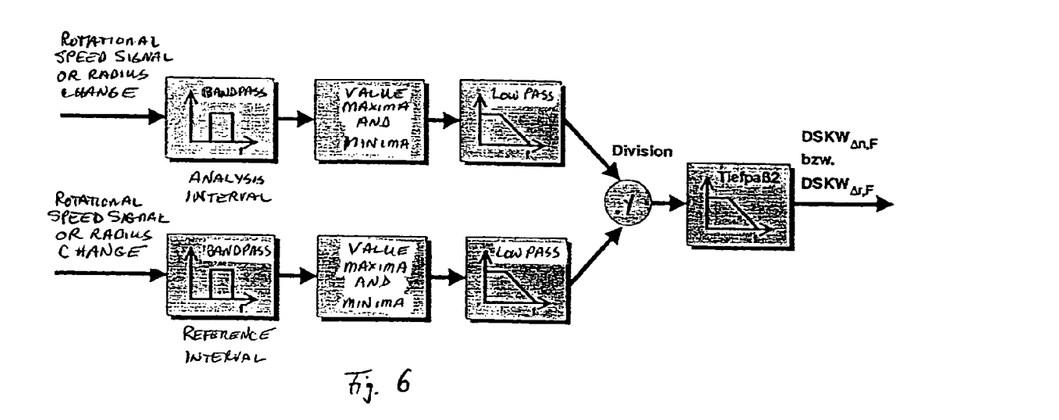
FIG. 6 is a conceptual block diagram which shows the computation of $DSKW_{\Delta n,F}$ or $DSKW_{\Delta r,F}$.

Because the DSKW is a relative characteristic damage value, squaring of the approximated amplitude spectrum $X(j\omega)$ and the limit value formation $T \to \infty$ will not be necessary in the computation. Furthermore, if a constant bumpiness w (preferably=2) is assumed, the right-hand parenthetical expression in equation (5) can be eliminated. (It causes only a scaling of $DSKW_{\Delta r}$ or $DSKW_{\Delta n}$.) The described structure for a characteristic shock absorber damage value $DSKW_{\Delta r,F}$ or $DSKW_{\Delta n,F}$ is illustrated in FIG. 6.

Other objects, advantages and novel features of the present invention will become apparent from the following detailed description of the invention when considered in conjunction with the accompanying drawings.

DETAILED DESCRIPTION OF THE DRAWINGS

The auto power density spectra or characteristic shock absorber damage values illustrated in FIGS. 1 to 4 represent results of test drives at the BMW test site by using a BMW 740iA with varying shock absorbing actions (parameters d, in the preceding equations). In this case, the "sporty" adjustment (high shock absorption) and the "comfortable" adjustment (low shock absorption) were used.

The reciprocal values of the rotational speeds of the rim n from the ABS sensor signal were recorded as input data for shock absorber damage detection according to the invention. The temporal course of the radius change Δr was determined therefrom according to equation (1).

As the analysis interval for the determination of the term $\Phi_{\Delta r}(\omega_{1,i}, d)$ in equation (5a), the range [12-15] Hz in the auto power density spectrum was selected; as the reference interval for the determination of the term $\Phi_{\Delta r}(\omega_{2,i})$, the range [30-33] Hz was selected. The quotients determined for these frequencies were added according equation (5a) and were emitted after low-pass-filtering.

Figure 1:
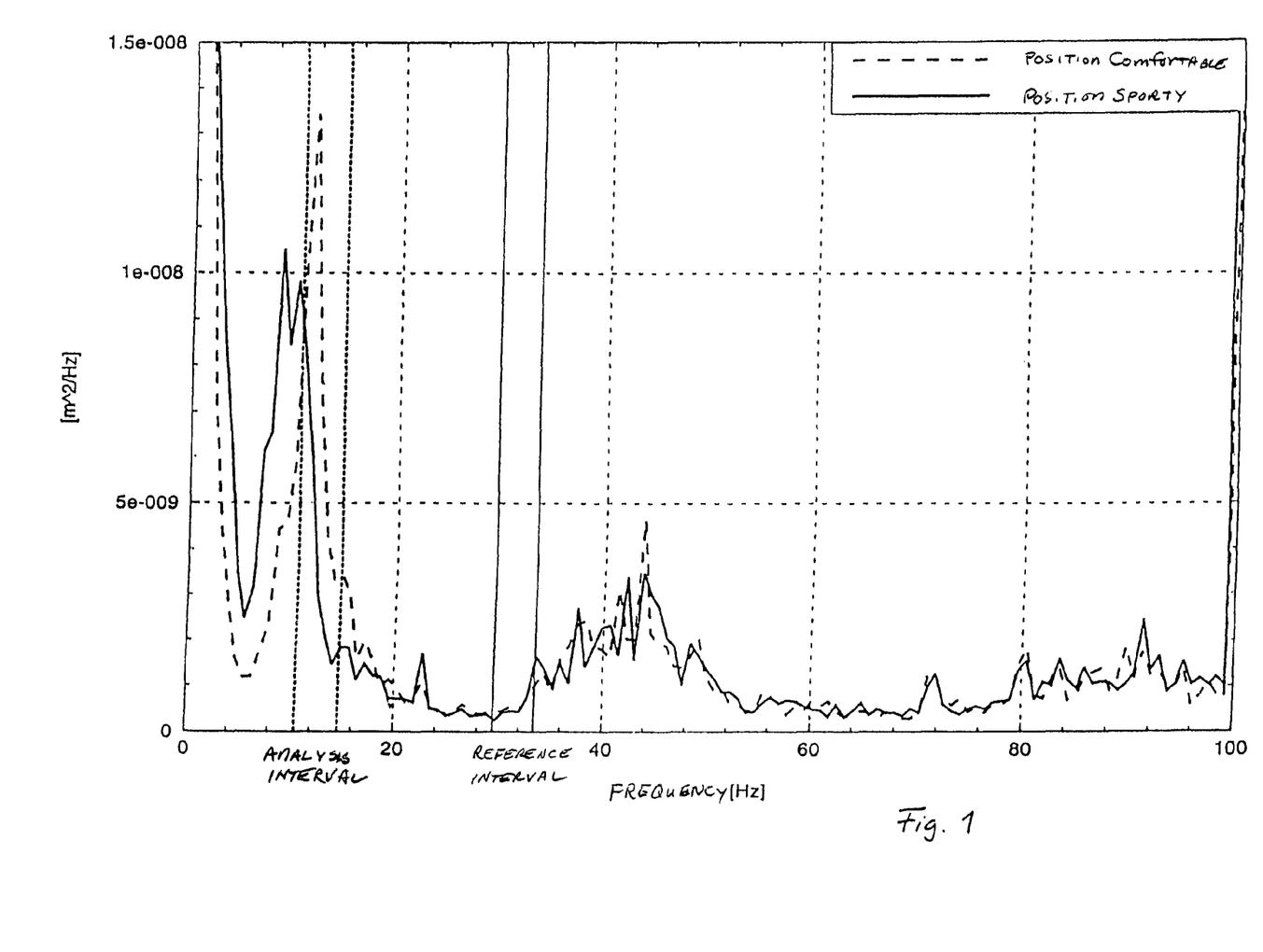
FIG. 1 shows the auto power density spectrum of the radius change of a front tire, left.
Figure 2:
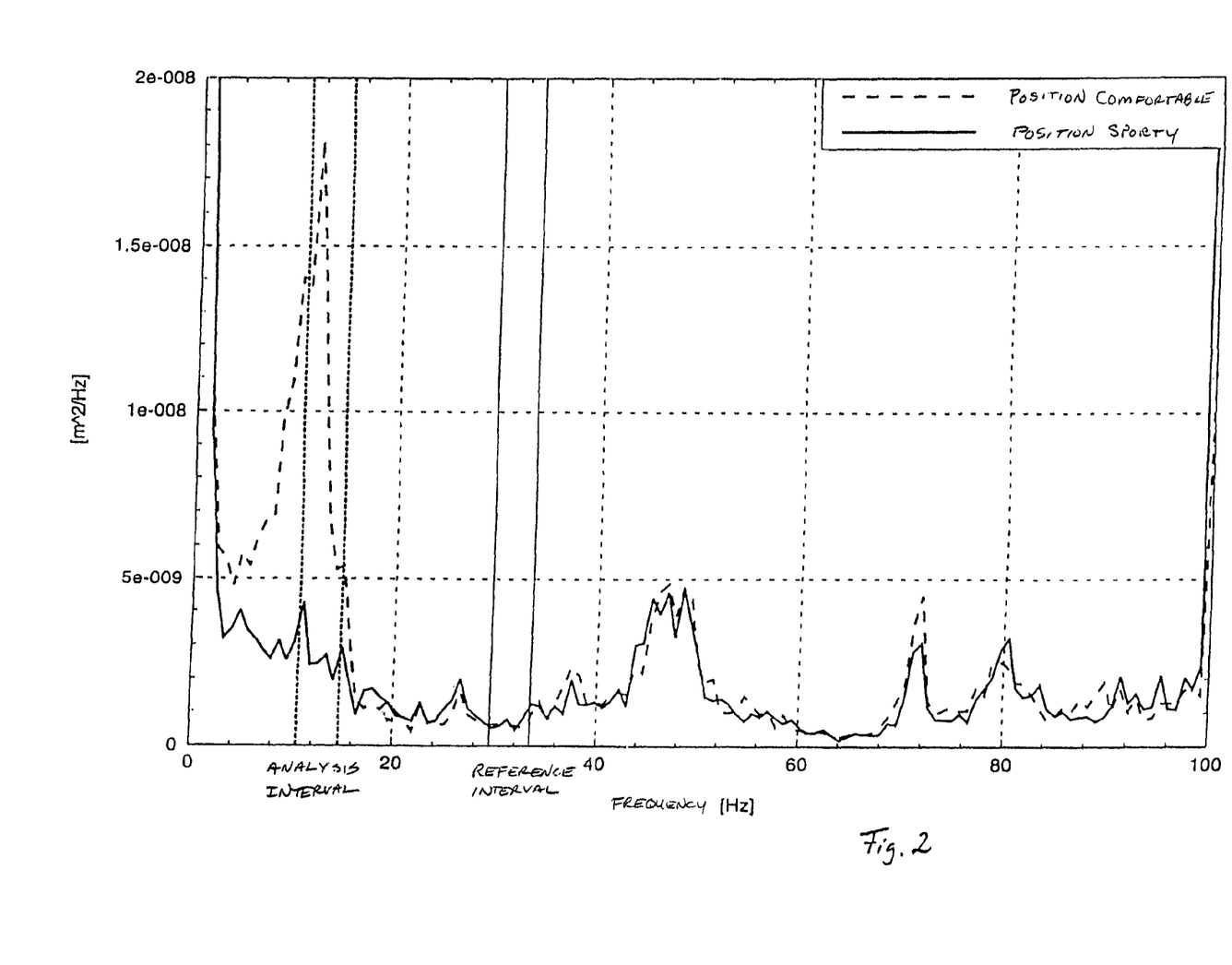
FIG. 2 shows the auto power density spectrum of the radius change of a rear tire, left.

The auto power density spectra of the radius change $\Phi_{\Delta r}$ of the left front wheel and of the left rear wheel of the data used to compute the characteristic shock absorber damage value are illustrated in FIGS. 1 and 2. In the range of the analysis interval [12-15] Hz, the influence of the shock absorber condition (here "comfortable" or "sporty") upon the course of the auto power density spectrum is clearly recognizable. In the range of the reference interval [30-33] Hz, such dependence cannot be detected. This means that the auto power density spectrum of the radius change is suitable for judging the shock absorber condition.

Figure 3:
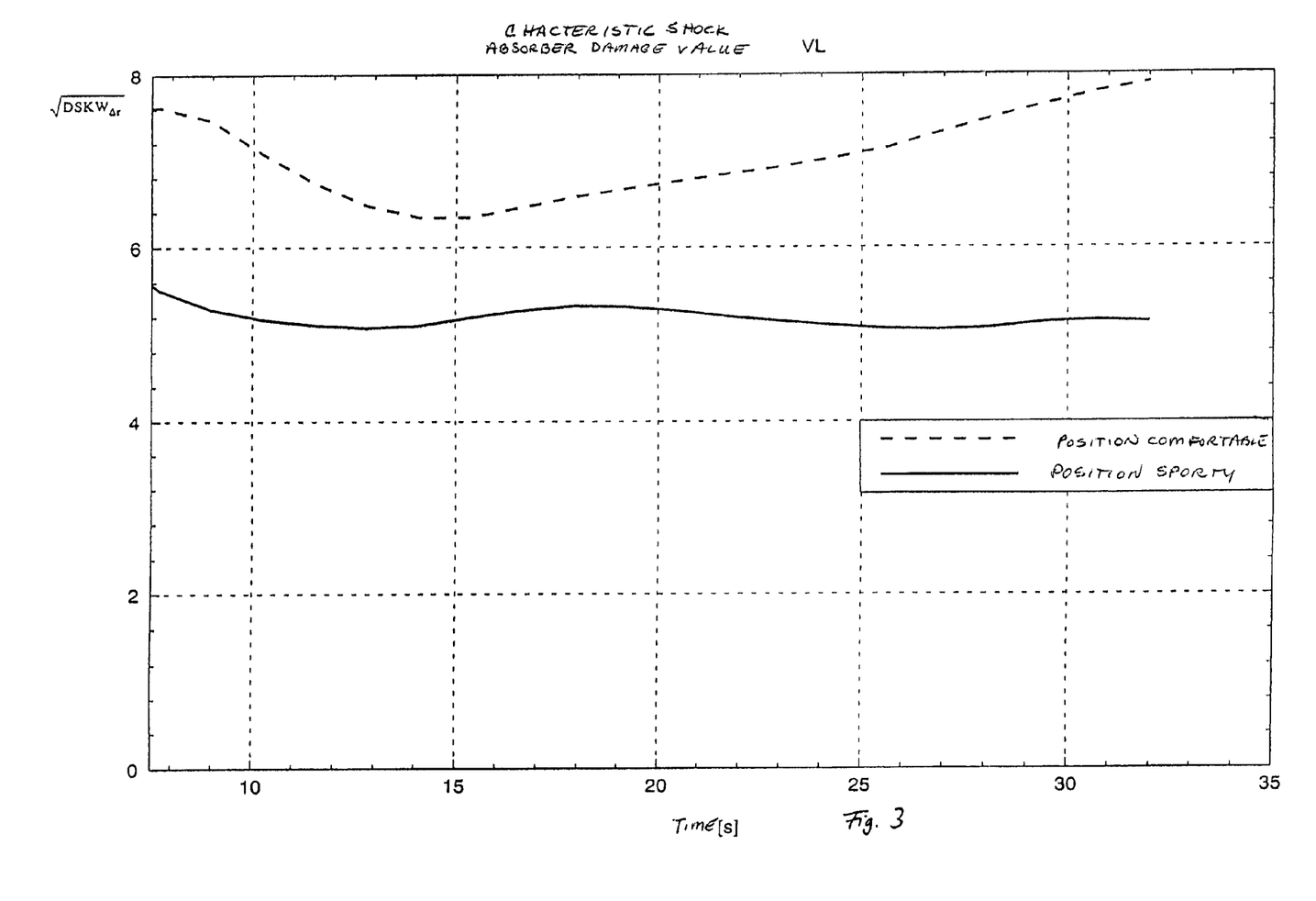
FIG. 3 shows the time variation of the characteristic shock absorber damage value for a front tire, left, for different shock absorber stages.
Figure 4:
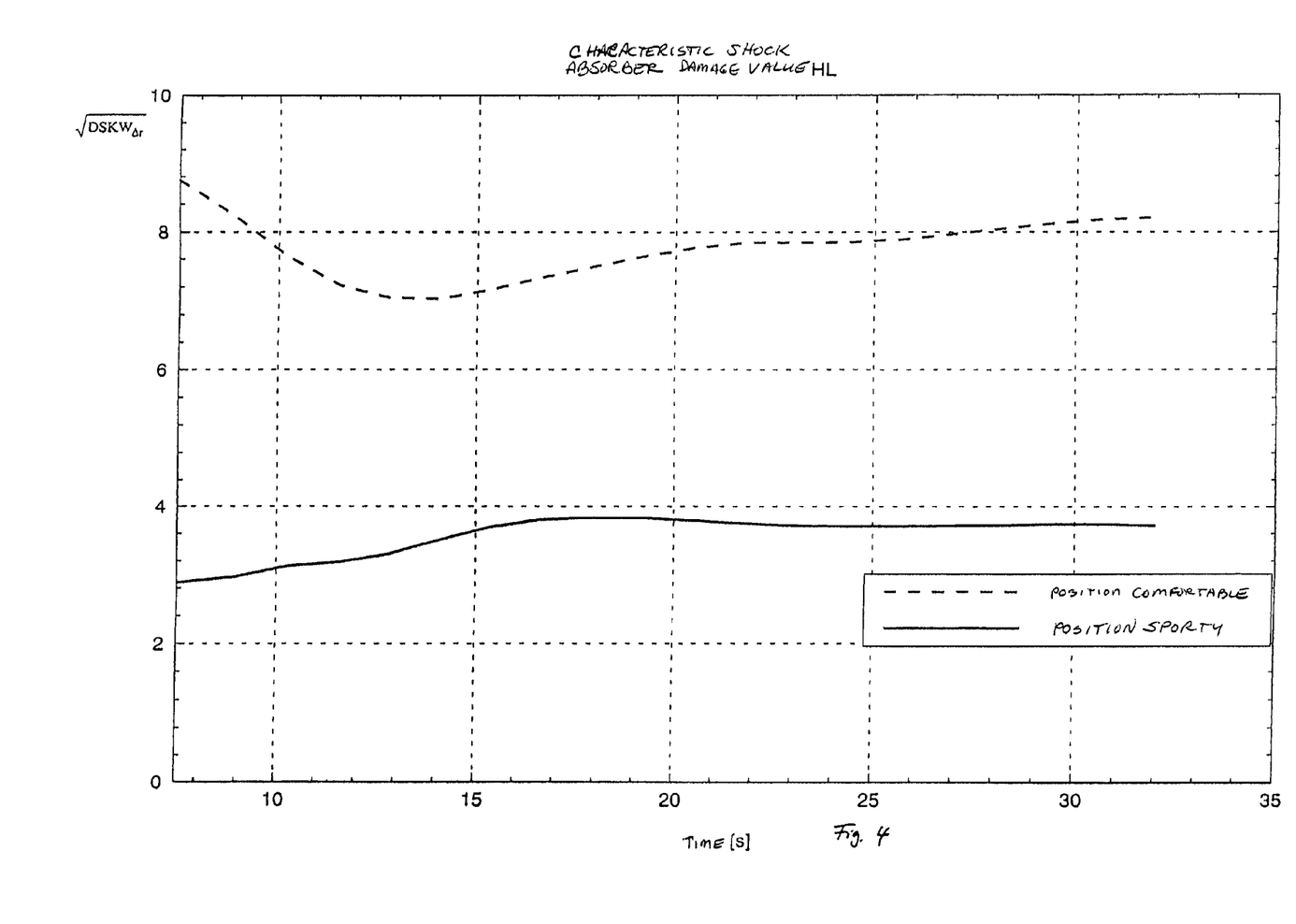
FIG. 4 shows the time variation of the characteristic shock absorber damage value for a rear tire, left, for different shock absorber stages.
Figure 5:
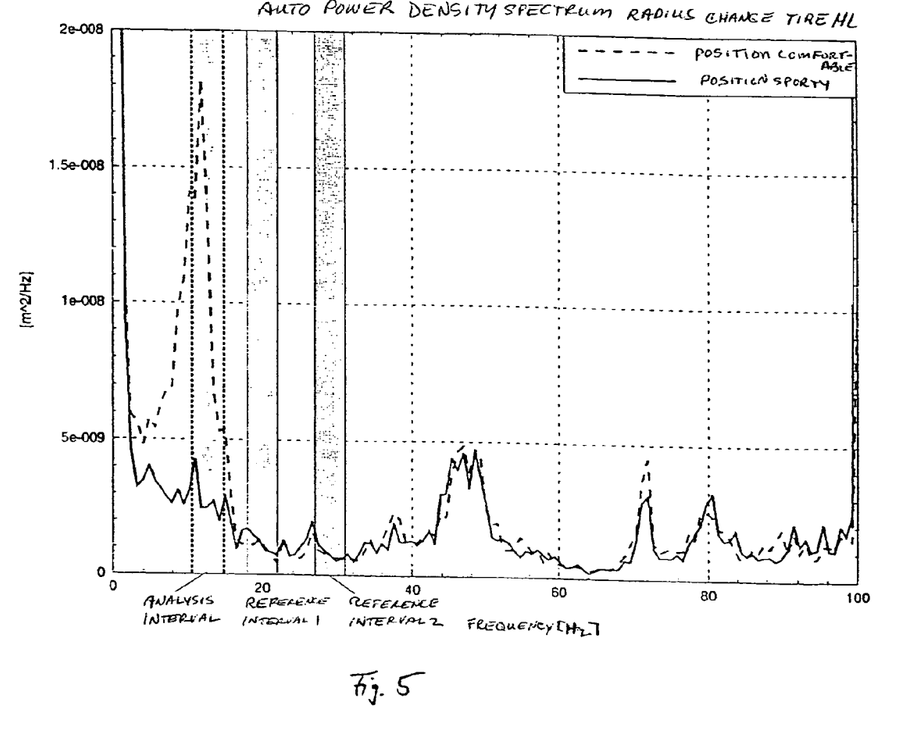
FIG. 5 shows the position of the analysis interval, of the first and second reference intervals in the auto power density spectrum of the radius change for a rear tire, left.

Based on the illustrated auto power density spectra for the radius change, the courses of the characteristic shock absorber damage value for the left front wheel or the left rear wheel illustrated respectively in FIGS. 3 and 4 are obtained as a function of the shock absorber stage (that is, simulated shock absorber condition) "sporty" or "comfortable". The temporal courses of the characteristic shock absorber damage values correspond to a constant speed of 80 km/h and an identical route profile. A comparison of FIGS. 3 and 4 shows that the difference in the characteristic shock absorber damage value as a function of the selected shock absorber stage is even more pronounced on the rear axle.

Various advantages are connected with the method according to the invention and with the system according to the invention. To detect shock absorber damage according to the invention, no additional sensor system is required, so that a cost-effective solution is provided by integration into an existing control unit. Furthermore, according to the invention, shock absorber condition can be analyzed during actual driving operation. In addition, maintenance of the shock absorbers can be implemented which meets the requirements. For example, shock absorber condition data can be provided to the respective monitoring organization (such as the Technical Surveillance Group) during a general inspection so that the vehicle owner will have no additional cost for a shock absorber inspection which may be planned for the future.

Using the structure illustrated in FIG. 6, measurements were carried out at the BMW test site by means of a BMW 740iA. Different shock absorber actions were adjusted by the selection of the shock absorber position ("sporty" corresponds to a high shock absorption and "comfortable" corresponds to a low shock absorption).

Figure 7:
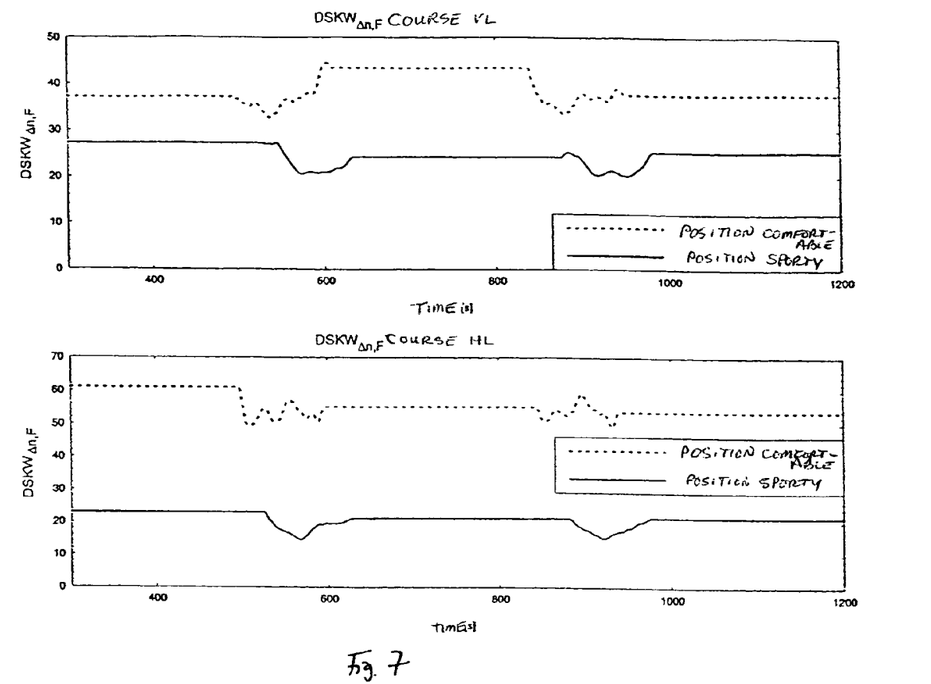
FIG. 7 shows the $DSKW_{\Delta n,F}$ course of the wheels, front left and rear left, for the shock absorber positions "sporty" and "comfortable"

The pertaining $DSKW_{\Delta n,F}$ courses are illustrated in FIG. 7. The top diagram shows the $DSKW_{\Delta n,F}$ course for the left front wheel, while the bottom diagram of FIG. 7 shows the course for the left rear wheel, once again for the respective shock absorber positions "sporty" and "comfortable". In partial areas, the algorithm is masked out, as described above. The illustration shows that the $DSKW_{\Delta n,F}$ or the $DSKW_{\Delta r,F}$ is suitable for drawing a conclusion with respect to the shock absorber condition.

Figure 8:
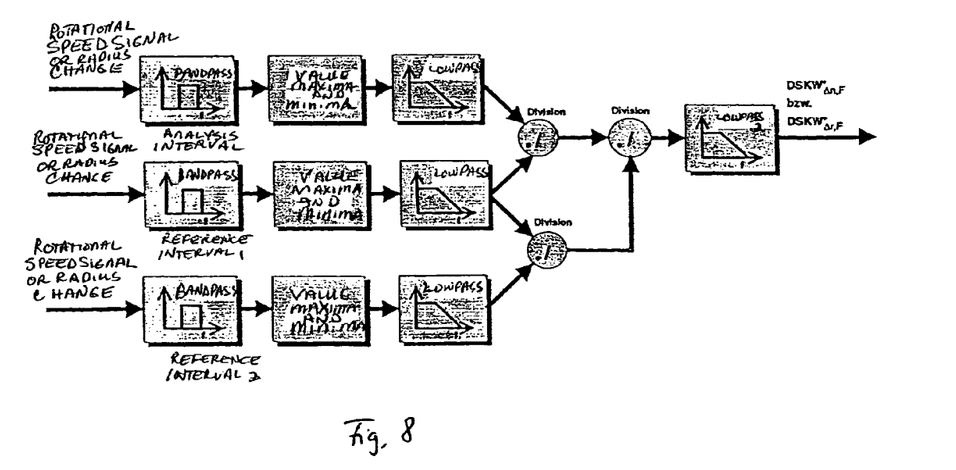
FIG. 8 is a conceptual block diagram which shows the computation of $DSKW'_{\Delta r,F}$ or $DSKW'_{\Delta n,F}$.

The above-mentioned characteristic damage value $DSKW'_{\Delta r,F}$ or $DSKW'_{\Delta n,F}$ is based on equation (8a) or equation (8b) For this purpose, FIG. 8 shows a simplified structure for determining these characteristic damage values according to the invention. The signal representing the rotational speed change or the radius change is first filtered by means of a corresponding band pass filter for an analysis interval or for first and second reference intervals. Subsequently, a value formation takes place of the determined maxima and minima, followed by filtering by a first low pass filter. This filtering is then followed by a quotient formation according to equations 8a and 8b. Finally, another filtering takes place by means of a second low pass filter.

Tests using a BMW 740iA at the BMW test site were carried out also by means of this algorithm. Analogous to the above-explained approach, different shock absorber actions were set as a result of the two shock absorber stages "sporty" (high shock absorbing forces) and "comfortable" (low shock absorbing forces). Qualitatively, the courses are the same as those illustrated in FIG. 7.

Figure 9:
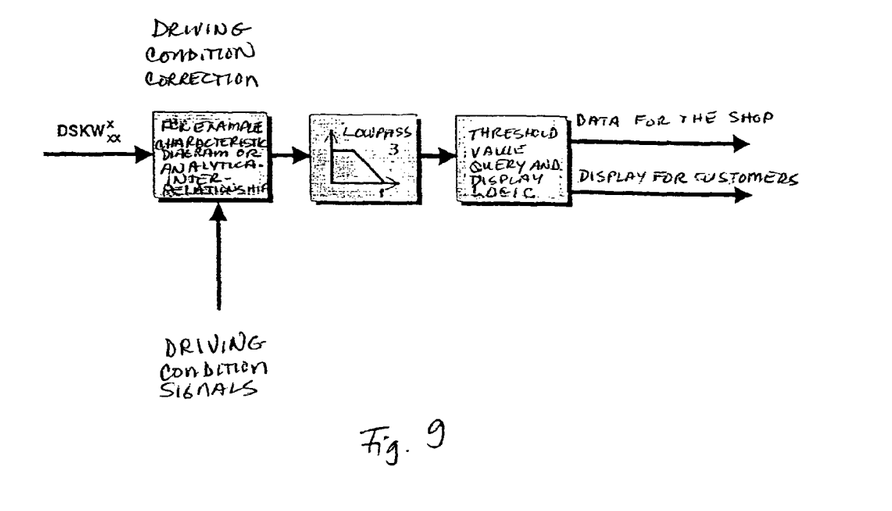
FIG. 9 shows the analysis logic for analyzing the characteristic shock absorber damage values $DSKW^x_{x,x}$.

Another additional processing of the $DSKW^x_{x,x}$ is illustrated in FIG. 9. Here, the $DSKW^x_{x,x}$ can be corrected, for example, by way of a functional or analytical relationship or by an experimentally determined relationship (for example, characteristic diagram) with respect to driving speed. In addition to driving speed, corrections are also advantageous here by means of the throttle valve angle, torque, gear position, rotational engine speed and operating condition of the converter clutch (in vehicles with an automatic transmission) or of the clutch switch (in vehicles with a manual transmission). By selecting the corner frequency of the "low pass 3" filter, the characteristic shock absorber damage value $DSKW^x_{x,x}$ can be averaged over a long term (for the useful life of the shock absorber).

Figure 10:
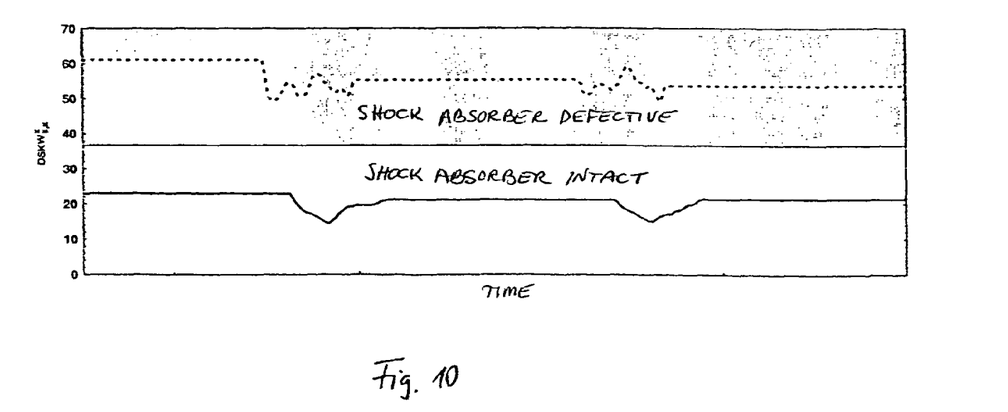
FIG. 10 shows the threshold value query for detecting the damage.

Shock absorber damage can be detected by querying the threshold value. As soon as the uncorrected or corrected $DSKW^x_{x,x}$ is in the damage range (FIG. 10), a conclusion is drawn that a shock absorber is defective and this information is processed. On the one hand, the information concerning a shock absorber defect can immediately be transmitted to the shop (defect memory with read-out in the shop or active shop notification); and on the other hand, it can be made accessible to the customer in the form of a display concept.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting shock absorber damage, comprising:
    detecting rotational wheel speed signals generated by a rotational wheel speed sensor which measures rotational wheel speed; and
    detecting shock absorber damage by analyzing said rotational wheel speed signals.

2. The method according to claim 1, wherein analyzing said rotational wheel speed signals includes one of determining a temporal course of a radius change $\Delta r$ of a vehicle tire, and determining a temporal course of a rotational speed change $\Delta n$ of a wheel rim, based on said wheel speed signals.

3. The method according to claim 2, further comprising computing at least one of an auto power density spectrum $\Phi_{\Delta r}$ for the temporal course of the radius change $\Delta r$, and an auto power density spectrum $\Phi_{\Delta n}$ for the temporal course of the rotational speed change $\Delta n$.

4. The method according to claim 3, further comprising computing a quotient $DSKW_{\Delta r}$ or $DSKW_{\Delta n}$ from the auto power density spectra for first and second frequency ranges, the computed quotient corresponding to a characteristic shock absorber damage value.

5. The method according to claim 4, wherein the quotient $DSKW_{\Delta r}$ or $DSKW_{\Delta n}$ is computed according to one of the two equations $$DSKW_{\Delta r} = \sum_{i=1}^{k} \frac{\Phi_{\Delta r}(\omega_{1,i}, d)}{\Phi_{\Delta r}(\omega_{2,i})} \cdot \left(\frac{\omega_{1,i}}{\omega_{2,i}}\right)^w$$

$$DSKW_{\Delta n} = \sum_{i=1}^{k} \frac{\Phi_{\Delta n}(\omega_{1,i}, d)}{\Phi_{\Delta n}(\omega_{2,i})} \cdot \left(\frac{\omega_{1,i}}{\omega_{2,i}}\right)^w$$

wherein
    $\omega_{1,i}$=discrete frequency values of the first frequency range,
    $\omega_{2,i}$=discrete frequency values of the second frequency range,
    w=bumpiness, preferably approximately 2, and
    k:=number of discrete frequency points.

6. The method according to claim 4, wherein the first frequency range corresponds to an analysis interval and the second frequency range corresponds to a reference interval.

7. The method according to claim 4, wherein the second frequency range has higher frequencies than the first frequency range.

8. The method according to claim 4, wherein the first frequency range has frequencies $\omega_{1,i}$ of approximately 12 to 15 Hz and/or the second frequency range has frequencies $\omega_{2,i}$ of approximately 19 to 22 Hz or approximately 30 to 33 Hz.

9. The method according to claim 4, further comprising:
    correcting the characteristic shock absorber damage value by means of at least one driving condition signal.

10. The method according to claim 9, wherein the driving condition signal is selected from the group consisting of driving speed, throttle valve angle, torque, rotational engine speed, gear position, operating condition of a converter clutch and position of a clutch switch group.

11. The method according to claim 4, further comprising:
comparing the characteristic shock absorber damage value with a threshold value to determine shock absorber condition.

12. The method according to claim 11, wherein shock absorber damage is present when the characteristic shock absorber damage value exceeds the threshold value.

13. The method according to claim 1, further comprising high-pass filtering of the rotational wheel speed signal.

14. The method according to claim 1, wherein said rotational wheel speed sensor is part of an antilock braking system.

15. The method according to claim 3, further comprising:
computing a quotient $DSKW'_{\Delta r}$ or $DSKW'_{\Delta n}$ from a quotient of the auto power density spectrum for first and second frequency ranges, and a quotient of the auto power density spectrum for the second frequency range and third frequency range, the computed quotient $DSKW'_{\Delta r}$ or $DSKW'_{\Delta n}$ corresponding to a characteristic shock absorber damage value.

16. The method according to claim 15, wherein the quotient $DSKW'_{\Delta r}$ or $DSKW'_{\Delta n}$ is computed according to one of the two equations $$DSKW'_{\Delta r} = \sum_{i=1}^{k} \left( \frac{\frac{\Phi_{\Delta r}(\omega_{1,i}, d)}{\Phi_{\Delta r}(\omega_{2,i})}}{\frac{\Phi_{\Delta r}(\omega_{2,i})}{\Phi_{\Delta r}(\omega_{3,i})}} \right)$$

$$DSKW'_{\Delta n} = \sum_{i=1}^{k} \left( \frac{\frac{\Phi_{\Delta n}(\omega_{1,i}, d)}{\Phi_{\Delta n}(\omega_{2,i})}}{\frac{\Phi_{\Delta n}(\omega_{2,i})}{\Phi_{\Delta n}(\omega_{3,i})}} \right)$$

wherein
$\omega_{1,i}$=discrete frequency values of the first frequency range,
$\omega_{2,i}$=discrete frequency values of the second frequency range,
$\omega_{3,i}$=discrete frequency values of the third frequency range,
and
k=number of discrete frequency points.

17. The method according to claim 15, wherein the first frequency range corresponds to an analysis interval, the second frequency range corresponds to a first reference interval, and the third frequency range corresponds to a second reference interval.

18. The method according to claim 15, wherein the second frequency range has higher frequencies than the first frequency range, and the third frequency range has higher frequencies than the second frequency range.

19. The method according to claim 15, wherein at least one of the following is true:
the first frequency range has frequencies $\omega_{1,i}$ of approximately 12 to 15 Hz;
the second frequency range has frequencies $\omega_{2,i}$ of approximately 19 to 22 Hz; and
the third frequency range has frequencies $\omega_{3,i}$ of approximately 30 to 33 Hz.

20. Apparatus for detecting shock absorber damage in a vehicle, said apparatus comprising:
a rotational wheel speed sensor which measures rotational wheel speed;
a processing unit coupled to receive rotational wheel speed signals generated by said rotational wheel speed sensor;
wherein said processing unit detects shock absorber damage by analyzing said rotational wheel speed signals of said rotational wheel speed sensor.

21. The apparatus according to claim 20, wherein said processing unit includes a component for determining one of a temporal sequence of a radius change $\Delta r$ of a vehicle tire, and a temporal course of a rotational speed change $\Delta n$ of a wheel rim, based on said rotational wheel speed signals.

22. The apparatus according to claim 21, wherein said processing unit comprises a component for computing at least one of an auto power density spectrum $\Phi_{\Delta r}$ for the temporal course of the radius change $\Delta_r$, and an auto power density spectrum $\Phi_{\Delta n}$ for the temporal course of the rotational speed change $\Delta_n$.

23. The apparatus according to claim 22, wherein said processing unit further comprises a component for computing a quotient $DSKW_{\Delta r}$ or $DSKW_{\Delta n}$ from the auto power density spectra for first and second frequency ranges, the computed quotient corresponding to a characteristic shock absorber damage value.

24. The apparatus according to claim 23, wherein the quotient $DSKW_{\Delta r}$ or $DSKW_{\Delta n}$ is computed according to one of the two equations $$DSKW_{\Delta r} = \sum_{i=1}^{k} \frac{\Phi_{\Delta r}(\omega_{1,i}, d)}{\Phi_{\Delta r}(\omega_{2,i})} \cdot \left( \frac{\omega_{1,i}}{\omega_{2,i}} \right)^{w}$$

$$DSKW_{\Delta n} = \sum_{i=1}^{k} \frac{\Phi_{\Delta n}(\omega_{1,i}, d)}{\Phi_{\Delta n}(\omega_{2,i})} \cdot \left( \frac{\omega_{1,i}}{\omega_{2,i}} \right)^{w}$$

wherein
$\omega_{1,i}$=discrete frequency values of the first frequency range,
$\omega_{2,i}$=discrete frequency values of the second frequency range,
w=bumpiness, preferably approximately 2, and
k:=number of discrete frequency points.

25. The apparatus according to claim 23, wherein said processing unit further comprises a correction component for correcting characteristic shock absorber damage value by means of at least one driving condition signal.

26. The apparatus according to claim 25, wherein the driving condition signal is selected from the group consisting of driving speed, throttle valve angle, torque, rotational engine speed, gear position, operating condition of a converter clutch, and position of a clutch switch group.

27. The apparatus according to claim 23, wherein said processing unit further comprises a component for comparing the characteristic shock absorber damage value with a threshold value to determine shock absorber condition.

28. The apparatus according to claim 27, wherein shock absorber damage is present as soon as the characteristic shock absorber value exceeds the threshold value.

29. The apparatus according to claim 22, wherein said processing unit further comprises a component for computing a quotient $DSKW'_{\Delta r}$ or $DSKW'_{\Delta n}$ from a quotient of the auto power density spectra for first and second frequency ranges, and a quotient of the auto power density spectrum for the second frequency range and a third frequency range, the computed quotient $DSKW'_{\Delta r}$ or $DSKW'_{\Delta n}$ corresponding to a characteristic shock absorber damage value.

30. The apparatus according to claim 29, wherein the quotient $DSKW'_{\Delta r}$ or $DSKW'_{\Delta n}$ is computed according to one of the two equations $$DSKW'_{\Delta r} = \sum_{i=1}^{k} \left( \frac{\frac{\Phi_{\Delta r}(\omega_{1,i}, d)}{\Phi_{\Delta r}(\omega_{2,i})}}{\frac{\Phi_{\Delta r}(\omega_{2,i})}{\Phi_{\Delta r}(\omega_{3,i})}} \right)$$

$$DSKW'_{\Delta n} = \sum_{i=1}^{k} \left( \frac{\frac{\Phi_{\Delta n}(\omega_{1,i}, d)}{\Phi_{\Delta n}(\omega_{2,i})}}{\frac{\Phi_{\Delta n}(\omega_{2,i})}{\Phi_{\Delta n}(\omega_{3,i})}} \right)$$

wherein $\omega_{1,i}$=discrete frequency values of the first frequency range, $\omega_{2,i}$=discrete frequency values of the second frequency range, $\omega_{3,i}$=discrete frequency values of the third frequency range, and k=number of discrete frequency points.

31. The apparatus according to claim 20, wherein said rotational wheel speed sensor is part of an antilock braking system.

32. A method for detecting shock absorber damage, comprising:
    detecting wheel speed signals generated by a rotational wheel speed sensor which measures rotational wheel speed; and
    determining an auto density spectrum based on said wheel speed signals;
    comparing values of said auto density spectrum within a reference frequency range wherein said values are substantially independent of effectiveness of shock absorber performance, with values of said auto density spectrum within an analysis frequency range, wherein said values depend on effectiveness of shock absorber performance; and
    detecting shock absorber damage, based on results of said comparing.

33. The method according to claim 32, wherein said auto density spectrum comprises one of rotational wheel speed change $\Delta n$ of a vehicle wheel rim, and a radius change $\Delta r$ of a vehicle tire.

34. The method according to claim 32, wherein said comparing comprises computing a quotient of said auto power density spectra within said analysis and reference frequency ranges.

35. The method according to claim 32, wherein said rotational wheel speed sensor is part of an antilock braking system.

* * * * *